US009665104B2

(12) United States Patent
Carter (10) Patent No.: US 9,665,104 B2
(45) Date of Patent: May 30, 2017

(54) STORE SEPARATION AUTOPILOT (71) Applicant: The United States of America, as represented by the Secretary of the Air Force, Washington, DC (US)

(72) Inventor: Ryan E Carter, Crestview, FL (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 299 days.

(21) Appl. No.: 14/332,529

(22) Filed: Jul. 16, 2014

(65) Prior Publication Data

US 2015/0241173 A1     Aug. 27, 2015

Related U.S. Application Data

(60) Provisional application No. 61/856,780, filed on Jul. 22, 2013.

(51) Int. Cl.
    *G05D 1/10* (2006.01)
(52) U.S. Cl.
    CPC .................... *G05D 1/107* (2013.01)
(58) Field of Classification Search
    CPC ............ G05D 1/107; F41G 7/00–7/36; F41G 9/00–9/025; B60T 17/22
    USPC .............. 244/3.1–3.3; 89/1.8–1.82; 102/384; 340/945–983
    See application file for complete search history.

(56) References Cited

U.S. PATENT DOCUMENTS

| 4,246,472 A | * | 1/1981 | Sun | F41G 9/02 235/401 |
| 5,451,014 A | * | 9/1995 | Dare | F41G 7/007 244/3.15 |
| 8,190,305 B1 | * | 5/2012 | Prince | G05D 1/107 244/175 |
| 8,708,283 B2 | * | 4/2014 | Tobias | B64D 1/12 244/137.4 |
| 2012/0024136 A1 | * | 2/2012 | McCants, Jr. | B64D 1/04 89/1.819 |

(Continued)

OTHER PUBLICATIONS

Nichols, R.H. and Denny, A.G., "Numerical Simulation of a Store in Controlled Separation" Applied Aerodynamics Conference, AIAA-1999-3128, American Institute of Aeronautics and Astronautics, Norfolk, VA, 1999.

(Continued)

*Primary Examiner* — Courtney Heinle
(74) *Attorney, Agent, or Firm* — AFMCLO/JAZ; Charles Figer, Jr.

(57) ABSTRACT

A method and apparatus are presented for guiding a store, represented by a dynamic system having transitory nonlinear characteristics, between release from a platform and an activation of a mission autopilot along an optimal path. A nominal reference trajectory is determined that optimizes a desired performance index for the dynamic system using optimal control theory. A feedback control system is implemented that optimizes an original performance index to second order in a presence of disturbances along the optimal path using neighboring optimal control. The feedback control system converges to a linear time invariant regulator approaching the desired operating condition along the optimal path. Finally, control of the store is transitioned to the mission autopilot.

7 Claims, 12 Drawing Sheets

(56) References Cited

U.S. PATENT DOCUMENTS

| | | | |
|---|---|---|---|
| 2012/0061507 A1* | 3/2012 | Grabmeier | B64D 1/12 244/3.15 |
| 2013/0041527 A1* | 2/2013 | Sowers | F42B 10/64 701/3 |
| 2015/0241173 A1* | 8/2015 | Carter | G05D 1/107 244/3.15 |

OTHER PUBLICATIONS

Atwood, C.A., "Computation of a Controlled Store Separation form a Cavity," Journal of Aircraft, vol. 32 No. 4, 1995, pp. 846-852.
Akroyd, Graham, "Weapon Separation Analysis Tools using Matlab(TM)," presented at the RTO AVT Symposium on "Functional and Mechanical Integration of Weapons and Land and Air Vehicles," held in Williamsburg, VA, Jun. 7-9, 2004.

* cited by examiner

STORE SEPARATION AUTOPILOT

CROSS-REFERENCE TO RELATED APPLICATIONS

This application claims the benefit of and priority to U.S. Provisional Application Ser. No. 61/856,780, entitled "Store Separation Autopilot," filed on Jul. 22, 2013, the entirety of which is incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

Field of the Invention

The present invention generally relates to guidance and control systems and, more particularly, to guidance and control systems for an expendable store.

Description of the Related Art

Tactical fighter and bomber aircraft have been used to carry and deliver ordinance since shortly after the dawn of aviation. In the earliest stages of air combat, separation of stores from the parent aircraft was of little concern. However, during the Vietnam War, the employment of heavy stores from larger jet-powered aircraft began to present difficulties for aircraft-store compatibility. Specifically, scenarios in high-speed flight were encountered where the released store failed to separate cleanly from the aircraft and instead became a projectile threatening the aircraft and on occasion re-contacting the aircraft in flight causing catastrophic damage and loss of life.

A store released from an aircraft in flight must traverse a nonuniform and unsteady flow field that may include complex shock interactions, large velocity gradients, regions of locally separated or reversed airflow, and severe flow angularity in the form of sidewash and downwash. Stores released from an internal weapons bay may also be subjected to a wake disturbance from the spoiler, dynamic pressure and velocity gradients across the shear layer, high frequency vibrations due to acoustic noise, and large perturbations in flow properties due to cavity oscillations. Although the region of nonuniform flow near the aircraft is exceedingly small compared to the full length of the store ballistic or fly-out trajectory, the effects are significant.

Store separation engineering, a subset of aircraft-store compatibility, is concerned with the flight characteristics of a store in proximity of the aircraft and other stores. Ground test, flight test, simulation, and analysis procedures have been developed which largely address the safety-of-flight issues first encountered in the Vietnam era. In most cases, the store can be ejected away from the aircraft with a sufficient vertical velocity and nose-down pitch rate to ensure safe separation. However, with the advent of smart weapons, standoff capabilities, and focused lethality the challenge in successful store separation has shifted from safety to acceptability. Whereas an unsafe separation may threaten the parent aircraft, an unacceptable separation may result in a failed mission or significant collateral damage due to guidance problems, loss of control, or damage to the store caused by the separation transients.

Modern sophisticated "smart" weapons are equipped with sensitive onboard electronics including inertial measurement systems, GPS units, sensors, seekers, and guidance computers. Standoff capability (the desirable ability to release a munition far away from the intended target) has resulted in complex aerodynamic shapes with neutral dynamic stability margins designed for maximum glide performance and minimal energy loss. Focused lethality (the desirable ability to destroy a designated target while minimizing collateral damage) has resulted in munitions that are smaller and lighter and therefore more dramatically affected by the exigent flow field surrounding the aircraft in flight. These tendencies have increased the sensitivity to separation-induced transients, potentially leading to large angular rates and attitudes, excessive energy loss, sensor saturation, structural limits, or departure from stable flight modes. A challenge in store separation is thus to ensure safety while also maintaining acceptability across the flight envelope.

Modern munitions are designed with an onboard guidance and control system to enable precise engagement of the intended targets. However, the control system is not usually activated until the store is sufficiently far away from the aircraft to avoid any potential interference. Often, the separation-induced transients result in large perturbations from the desired flight attitudes that require a dedicated "rate-capture" phase for recovery before the munition can begin the fly-out trajectory. In the relatively few cases where the autopilot is engaged earlier (to prevent build-up of irrecoverable rates and attitudes), the mutual aerodynamic interference between the store and aircraft is neglected in the autopilot design leading to increased risk through reduced confidence in simulation capabilities and potentially unsafe behavior of the autopilot reacting to flow field perturbations without consideration of the nearby aircraft.

Accordingly, there is a need in the art for a transitional control system that accounts for separation-induced transients to guide a store along a preferred trajectory.

SUMMARY OF THE INVENTION

A method of guiding a store between release from a platform and an activation of a mission autopilot along an optimal path is presented where the store is represented by a dynamic system having transitory nonlinear characteristics. A nominal reference trajectory is determined that optimizes a desired performance index for the dynamic system using optimal control theory. A feedback control system is implemented that optimizes an original performance index to second order in a presence of disturbances along the optimal path using neighboring optimal control. The feedback control system converges to a linear time invariant regulator approaching the desired operating condition along the optimal path. Finally, control of the store is transitioned to the mission autopilot.

In an embodiment incorporated into an air-to-ground guided munition, a flight management system is configured to manipulate flight control surfaces of the air-to-ground munition. The flight management system includes a store separation autopilot and a mission autopilot. The store separation autopilot is activated when the air-to-ground munition is released from a platform. Furthermore, the store separation autopilot is configured to determine a nominal reference trajectory that optimizes a desired performance index for the dynamic system using optimal control theory. Similarly, a feedback control system is implemented in the store separation autopilot that optimizes an original performance index to second order in a presence of disturbances along the optimal path using neighboring optimal control and corresponding manipulation of the flight control surfaces. The feedback control system converges to a linear time invariant regulator approaching the desired operating condition along the optimal path. Then, control of the flight management system of the air-to-ground munition is transitioned to the mission autopilot.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Combat aircraft utilize expendable stores such as missiles, bombs, flares, and external tanks to execute their missions. Safe and acceptable separation of these stores from a parent aircraft is essential for meeting mission objectives. In many cases, the employed missile or bomb includes an onboard guidance and control system to enable precise engagement of a selected target such as another aircraft for an air-to-air guided munition or a land based target for an air-to-ground guided munition. Due to potential interference, the guidance and control system is generally not activated until the store is sufficiently far away from the aircraft. This delay may result in large perturbations from a desired flight attitude caused by separation transients, significantly reducing effectiveness of the store and jeopardizing mission objectives.

The flow field characteristics may cause the store to exhibit behavior that compromises the safety of the airframe and crew or that compromises the effectiveness of the store itself. Prediction of the flight characteristics of the store in the vicinity of the aircraft is therefore vitally important for ensuring the safety and effectiveness of the release. Modeling and simulation capabilities also play an integral role in the cost-effective assessment of separation characteristics for a range of aircraft and store configurations throughout the aircraft flight envelope.

Figure 1:
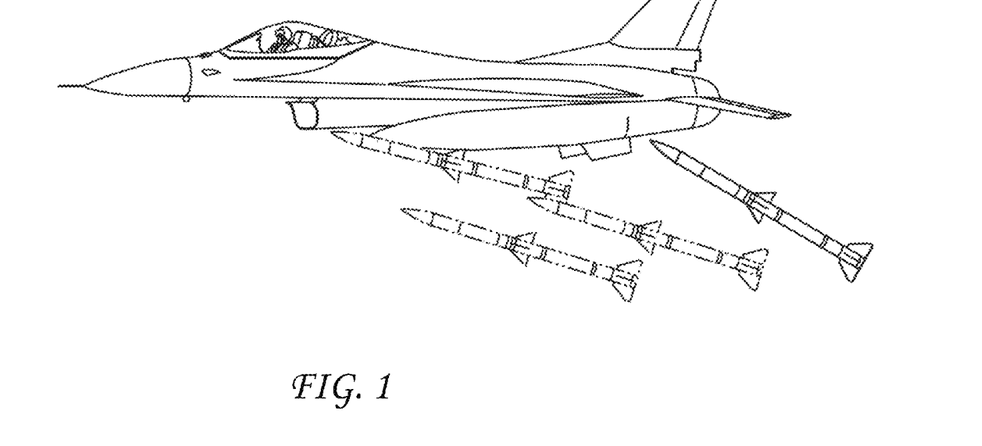
FIG. 1 is an exemplary illustration of an unsafe and unacceptable release of a store.

Successful store separation is a balance between two competing objectives. First, a successful store separation trajectory must be safe and not exhibit any threatening motion toward the aircraft, as illustrated in FIG. 1. In some cases, lateral motion is the primary concern due to tight tolerances between the store and adjacent aircraft components or additional stores. However, in most cases, safe separation is dominated by the vertical translation of the store. If the store escapes the aircraft flow field with a monotonically increasing vertical velocity, then the trajectory is considered safe. If the store hesitates or begins to flyback to the aircraft, the trajectory is considered unsafe. Due to uncertainties in separation prediction methods and variations in store and aircraft properties, flight-testing of unsafe trajectories is usually avoided altogether.

In most cases, the store is launched from an ejector providing an initial vertical velocity. In order to flyback, the store must generate enough aerodynamic lift to first arrest the vertical velocity and then begin translation in an upward direction. Thus, flyback is always preceded by a significant duration at a positive angle of attack. For most stores, limiting the angle of attack can ensure a safe separation. The safety margin is increased when the angle of attack is negative throughout much of the trajectory, generating aerodynamic forces in the direction of translation and accelerating the store away from the aircraft.

A second criterion for a successful separation is that the trajectory must be acceptable, i.e. the transitory effects of the separation must not compromise the ability of the store to achieve a specified mission. An unsafe trajectory cannot be acceptable, but a safe trajectory may be unacceptable, such as the trajectory illustrated in FIG. 2. Therefore, safety is a subset of acceptability. In comparison to safety, it is generally more difficult to quantify and ensure acceptability. However, acceptability can be adequately addressed by the following four conditions.

Store total aerodynamic angle of attack should not exceed the specified range for which the store autopilot has been designed to function properly.

Angular rates and accelerations should not exceed the specified range for which the onboard instrumentation is sufficient to measure.

Control inputs should not exceed the specified capability of the control actuators.

Total aerodynamic loads should not exceed the safety margins for the structural integrity of the store and empennage.

Precise statement of the acceptability conditions requires consideration of a specific system. In general terms, acceptability can be achieved by keeping the total angle of attack and angular rates low and by limiting control effort. A narrow but useful condition for acceptability, especially in control system design, is to require the state and input be maintained within a certain predefined operating range over which the control system has been designed to function properly.

Figure 3:
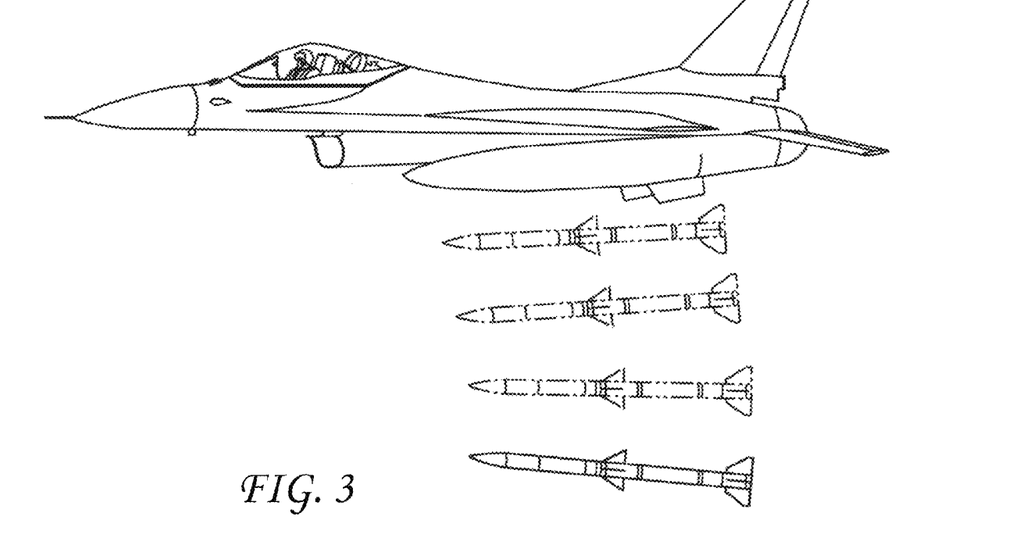
FIG. 3 is an exemplary illustration of a safe and acceptable release of a store.

Finally, it is recognized that a separation autopilot is a transitional control system, intended to guide the store through the nonuniform flow field and transfer the control to the mission autopilot. As such, an objective of a separation autopilot is to safely drive the store to a near-equilibrium state at or before the transition to the mission autopilot such as illustrated in FIG. 3. Therefore, it is desirable not only for certain components of the state to be near zero, but also for certain components of the derivative of the state to be near zero.

Previous studies have highlighted the use of active control to improve separation characteristics; however, embodiments of the invention are the first to consider guidance and control specifically for store separation. Guidance herein refers to the determination of a preferred path from release to a stable trimmed flight condition with explicit dependence on aerodynamic interaction between a store and an aircraft. Control herein refers to a manipulation of aerodynamic forces using deflections of control surfaces 12, 14, such as those illustrated in FIG. 4, to steer the store 10 along the preferred trajectory in the presence of disturbances.

Figure 4:
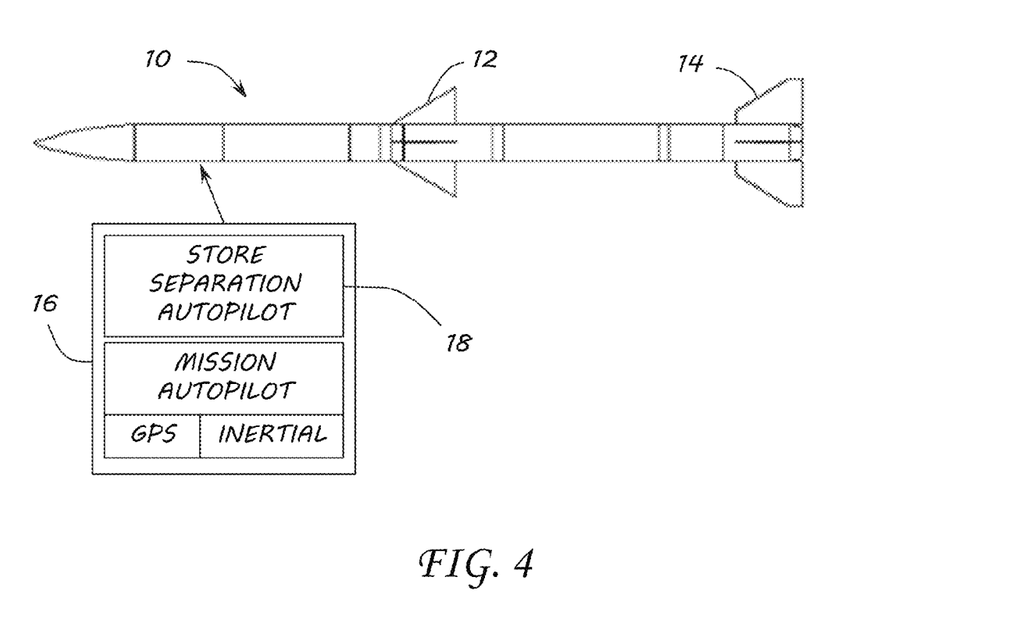
FIG. 4 is an exemplary diagram of a store illustrating a flight management system and control surfaces.

Flight vehicles, such as aircraft and guided stores 10, use flight management systems (FMS) 16 to achieve guidance and control throughout the flight profile. The pilot or FMS will frequently switch between autopilots that perform different functions, such as altitude hold, climb/descent, bank-to-turn, etc. In this context, a store separation autopilot 18 is a transitional control system, designed to effectively transfer the store from release to a stable trimmed flight condition. This transitional duration may be approximately one second after release in some embodiments. Spatially variant aerodynamic characteristics are accounted for through the nominal optimal trajectory 22 as seen in an exemplary feedback control loop 20 in FIG. 5. Response to varying initial conditions and flow field disturbances are accounted for using full-state feedback based on neighboring optimal control techniques 24.

Figure 6:
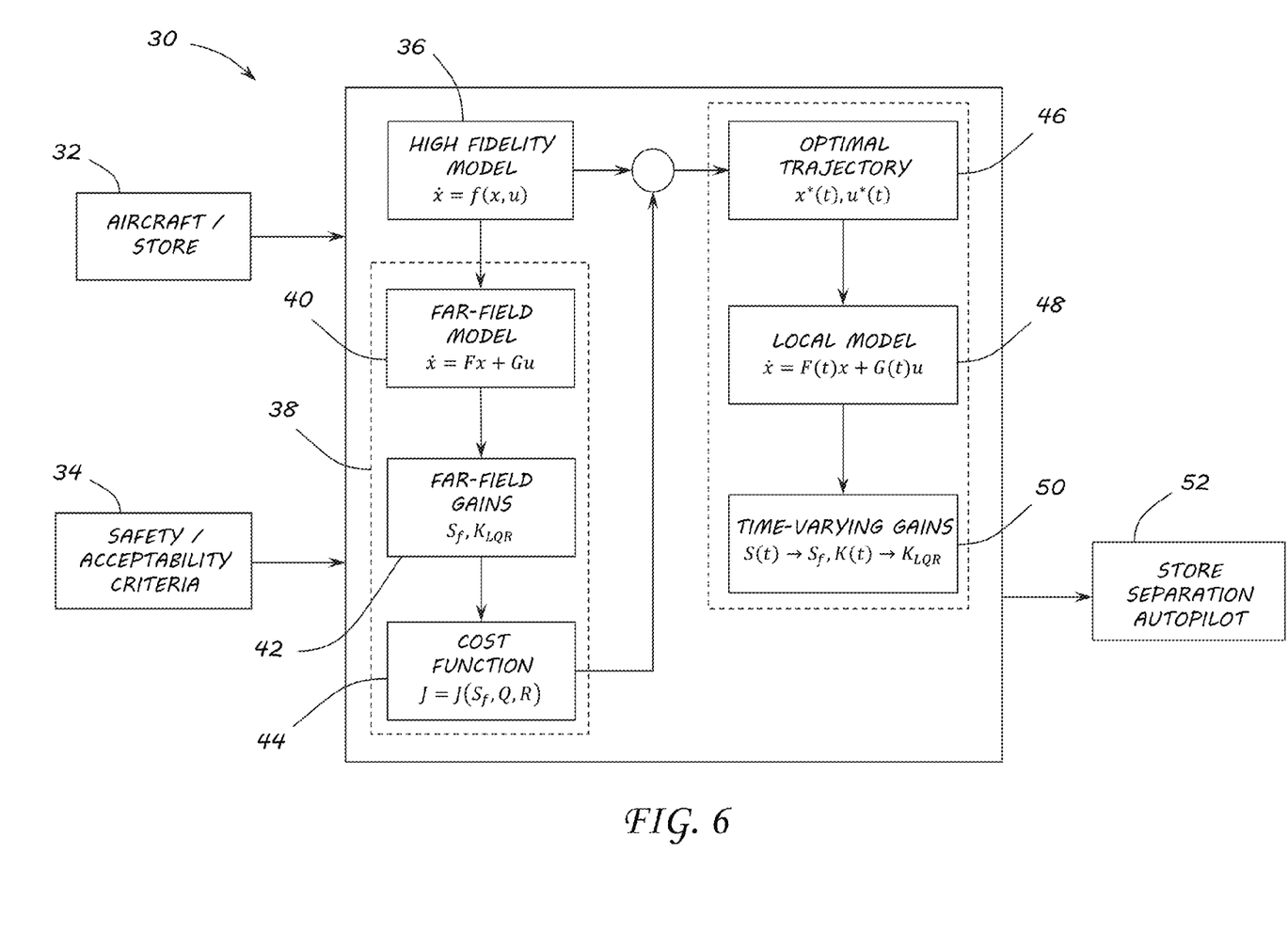
FIG. 6 is a block diagram illustrating components of a store separation autopilot consistent with embodiments of the invention.
Figure 7A:
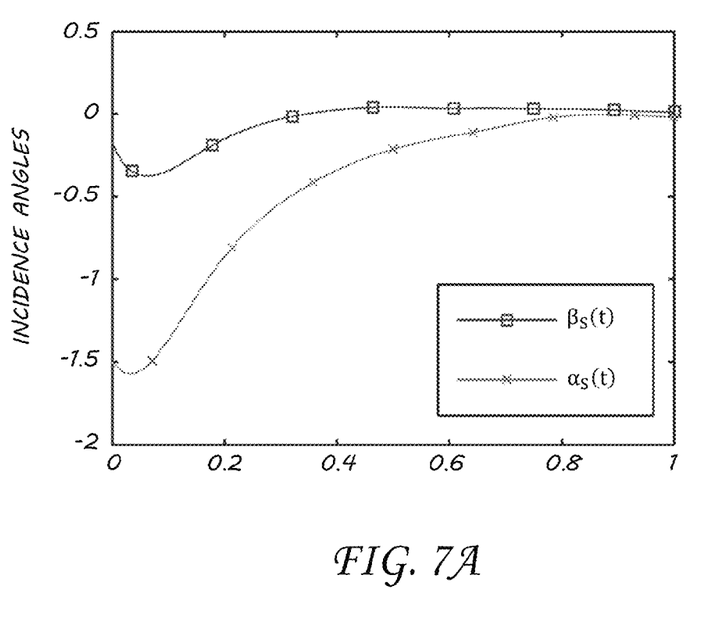
FIGS. 7A-D are graphs of optimal flight trajectory attributes for an exemplary subsonic test mission.
Figure 7B:
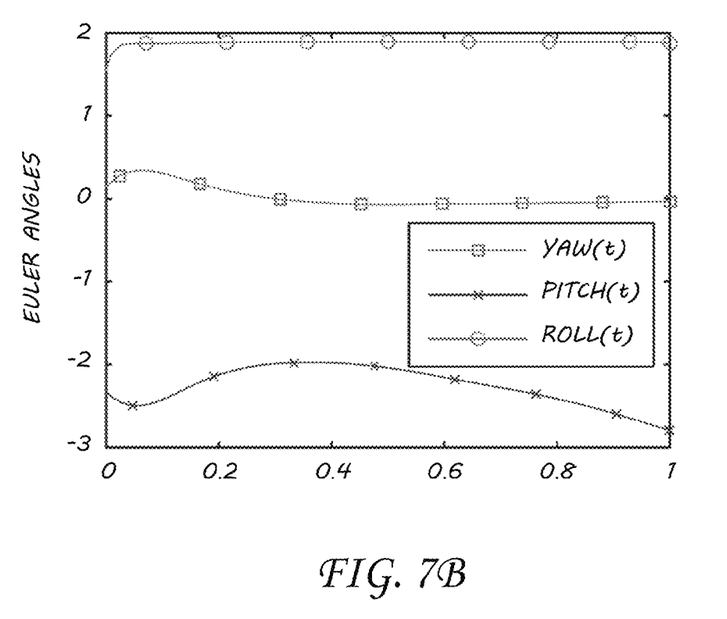
Figure 7C:
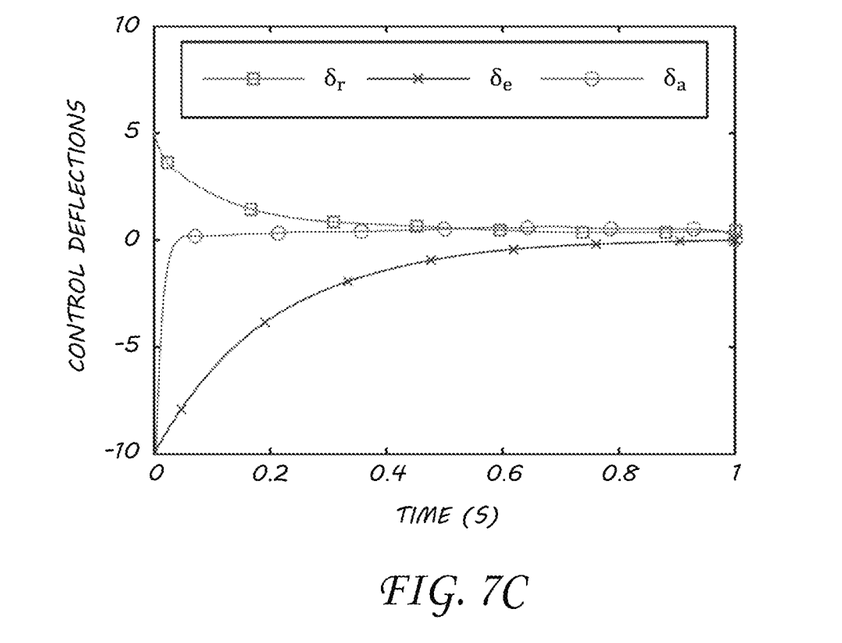
Figure 7D:
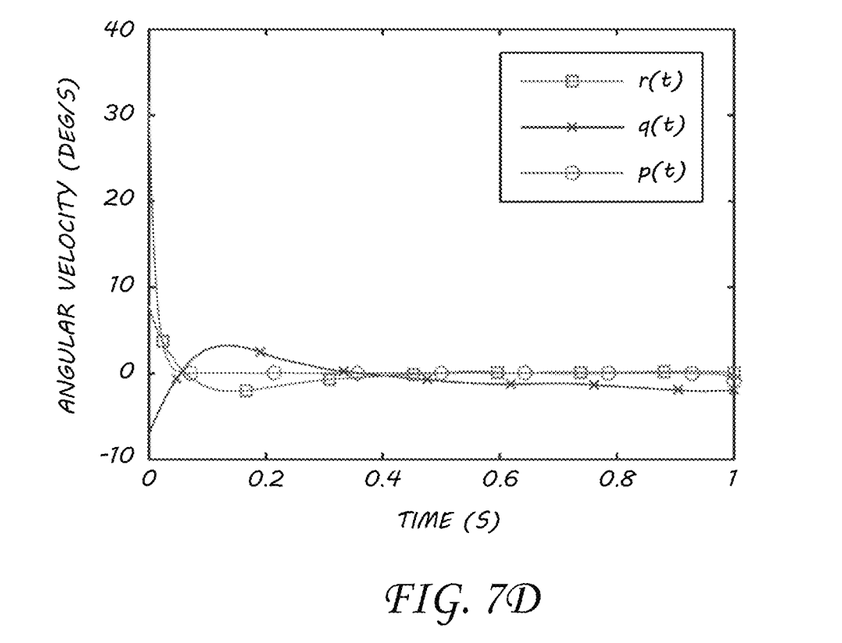
Figure 8A:
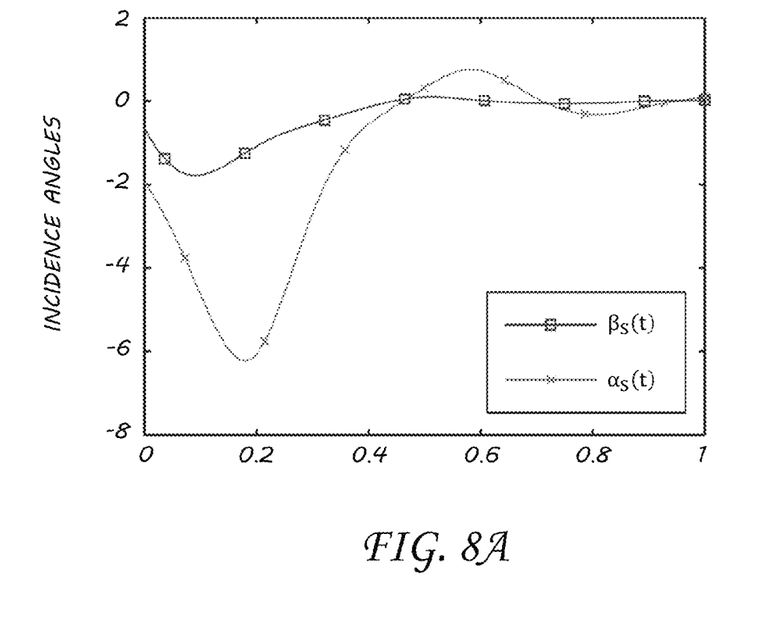
FIGS. 8A-D are graphs of optimal flight trajectory attributes for an exemplary supersonic test mission.
Figure 8B:
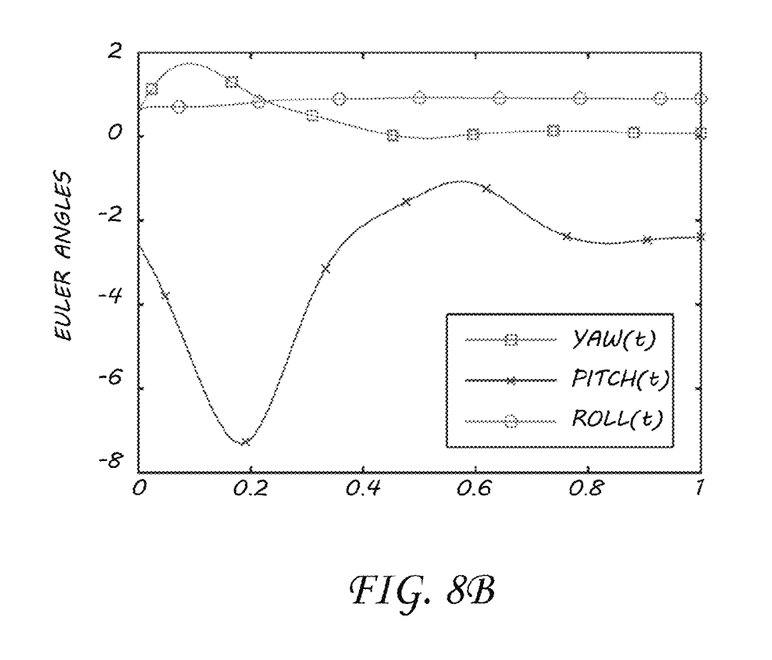
Figure 8C:
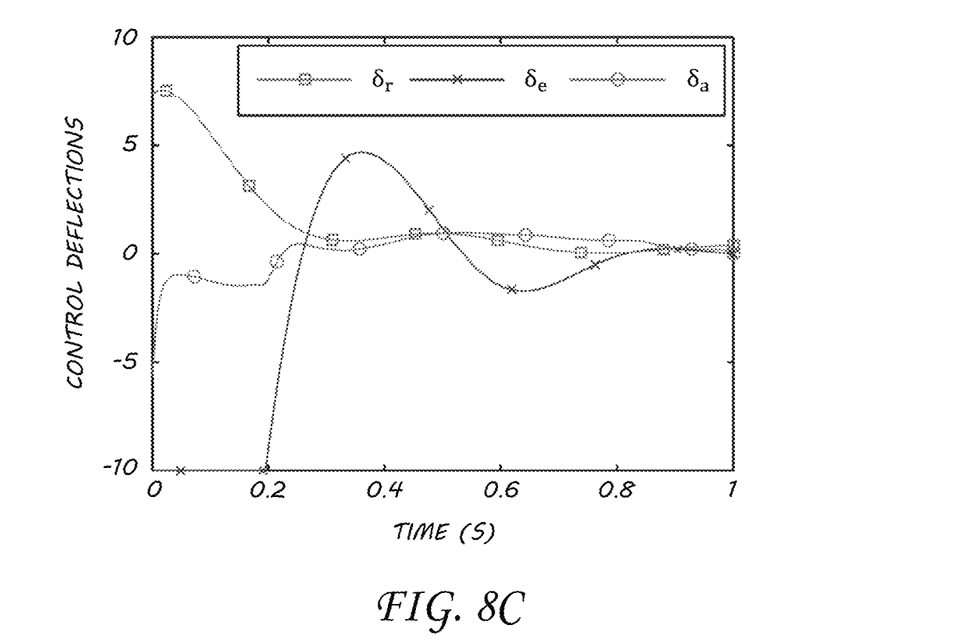
Figure 8D:
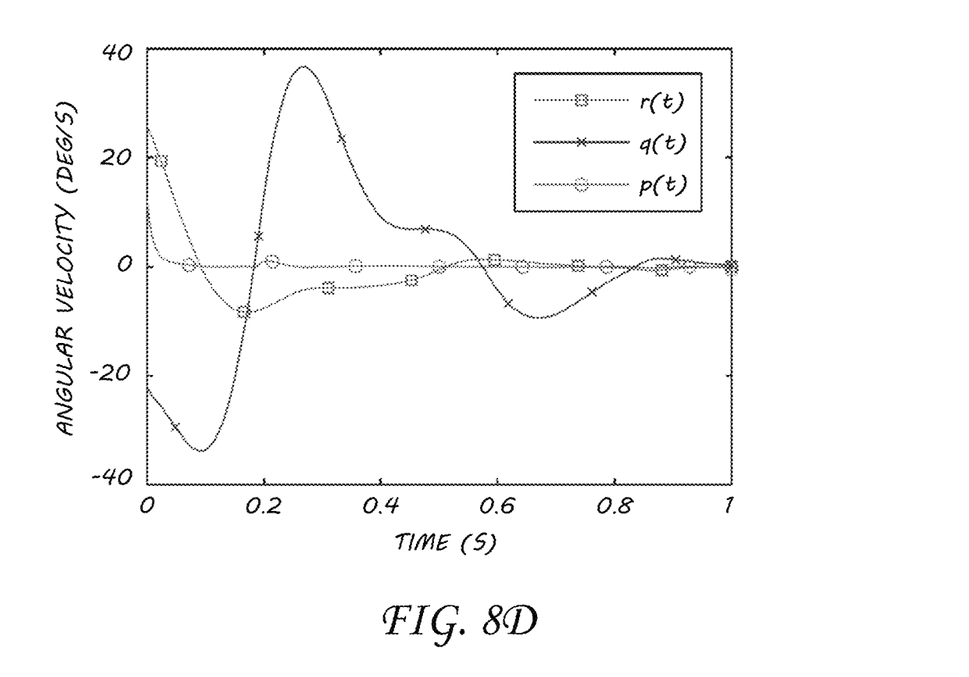
Figure 9A:
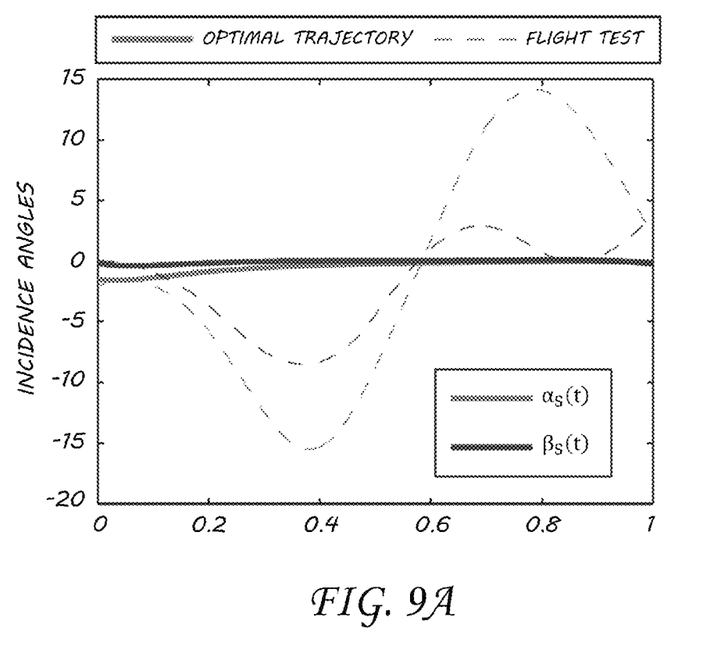
FIGS. 9A-D are graphs of a comparison of optimal and flight test trajectory attributes for the exemplary subsonic test mission of FIGS. 7A-D.
Figure 9B:
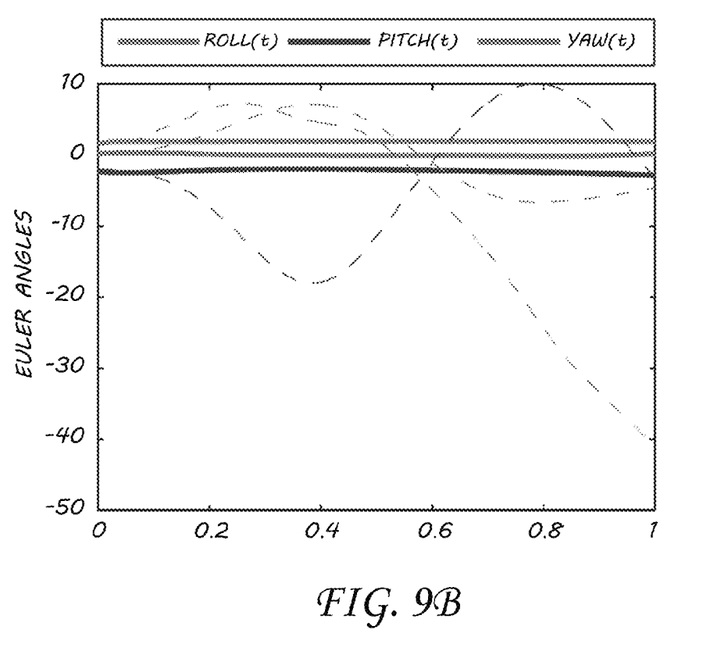
Figure 9C:
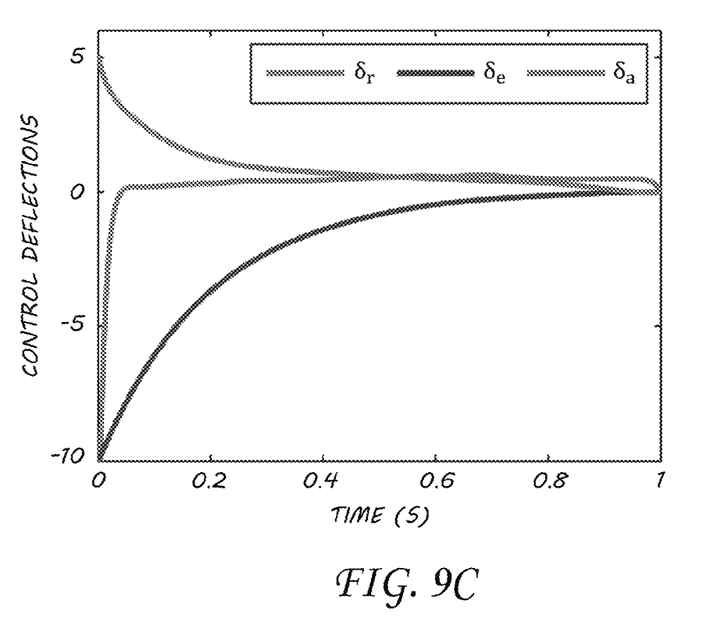
Figure 9D:
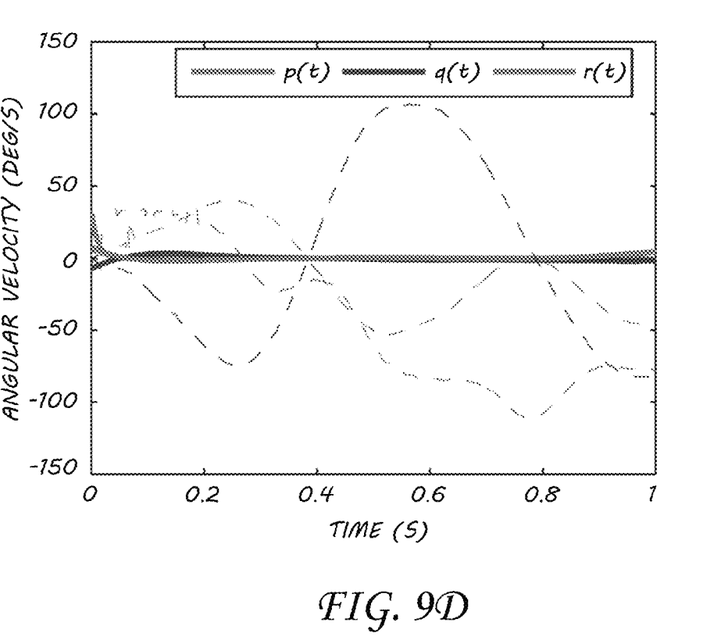
Figure 10A:
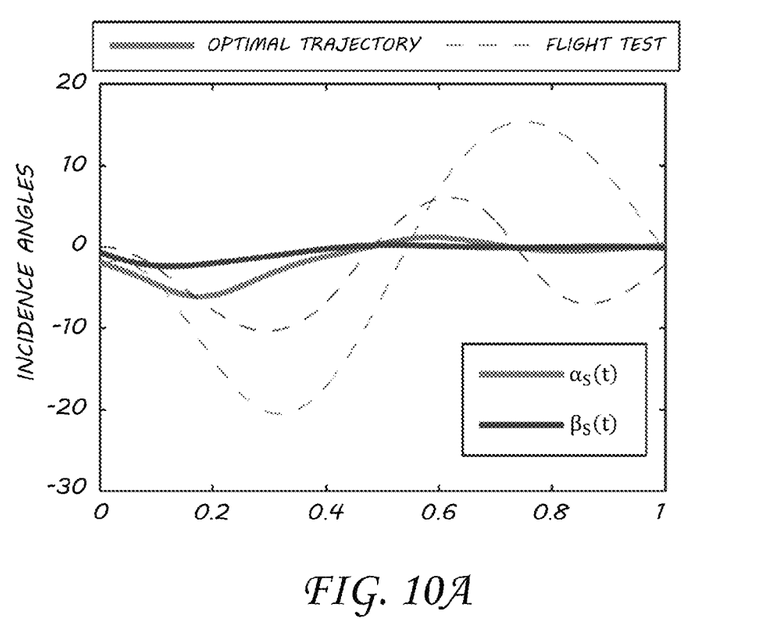
FIGS. 10A-D are graphs of a comparison of optimal and flight test trajectory attributes for the exemplary supersonic test mission of FIGS. 8A-D.
Figure 10B:
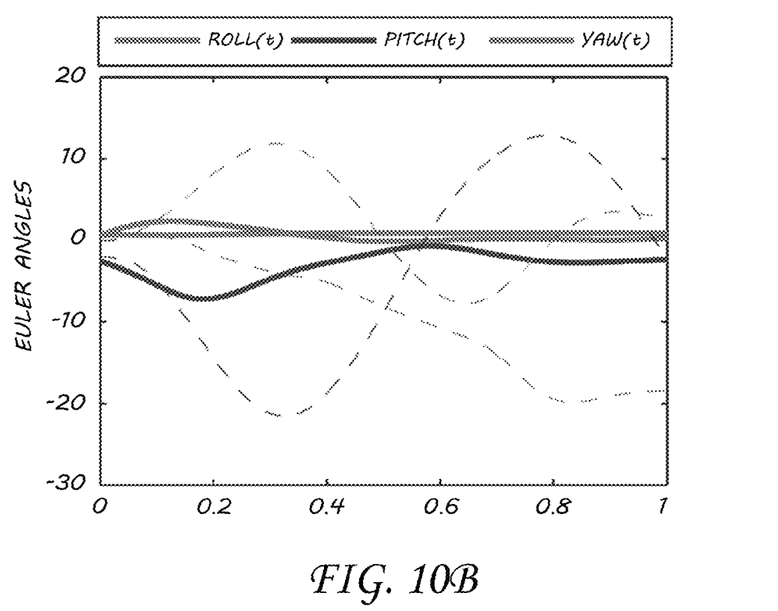
Figure 10C:
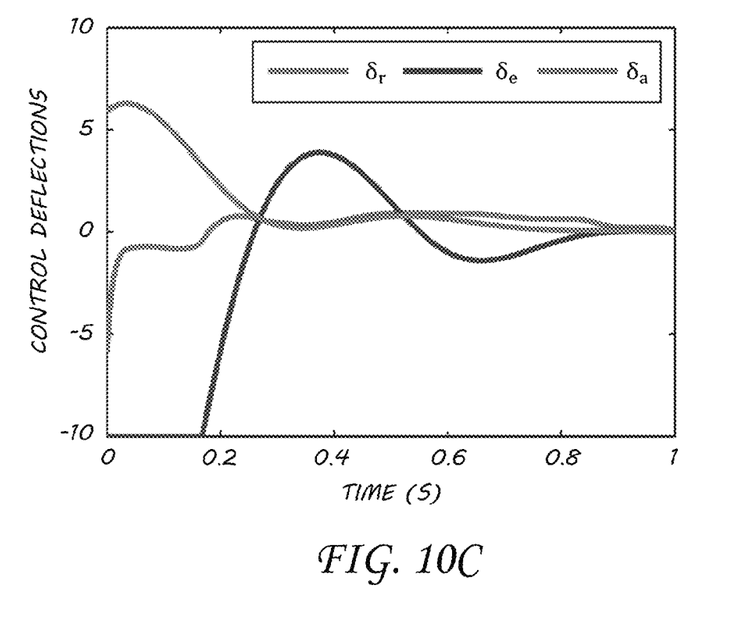
Figure 10D:
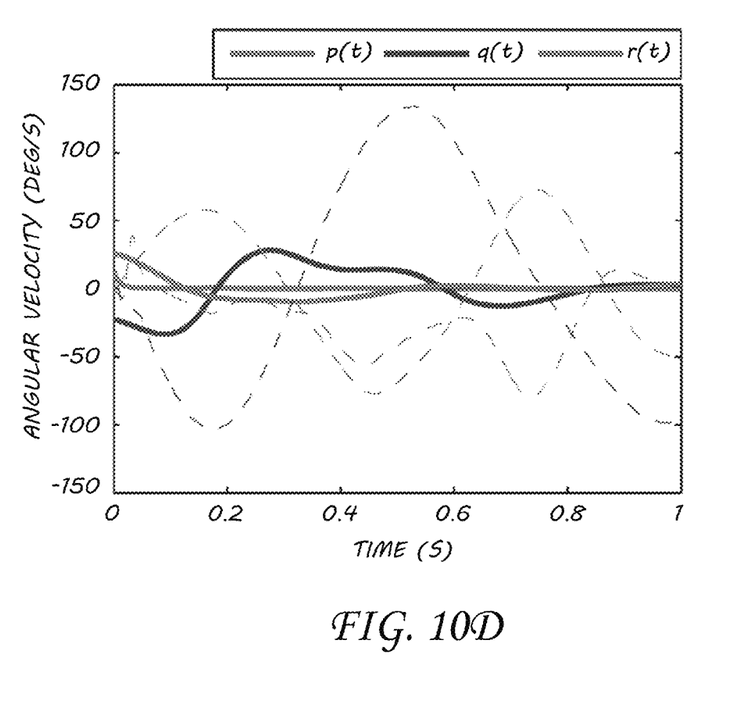

A design of an exemplary store separation autopilot 30, as illustrated in FIG. 6 and consistent with embodiments of the invention, begins with a technical description of an aircraft and a store 32, including characterization of aerodynamic interference effects usually acquired from wind tunnel testing or numerically from computational fluid dynamics. Additionally, the autopilot 30 may be designed to include a specific set of safety and acceptability criteria 34. The dynamic system 32 and safety and acceptability criteria 34 form the inputs to the store separation autopilot 30 formulation.

Using the aircraft/store input data 32, a high-fidelity aircraft/store numerical model 36 may be constructed using conventional techniques for store separation trajectory prediction. A store aerodynamic model 38 is a subset of the high-fidelity aircraft/store model 36. Linearization of the store aerodynamic model at a particular trim condition leads to a local far-field model 40 that neglects aerodynamic interference from the aircraft. The linear far-field model is used to determine the constant Linear Quadratic Regulator (LQR) feedback control gains ($K_{LQR}$) 42, using conventional LQR design techniques for a linear time-varying system. The end-point Mayer cost $S_f$ may be readily determined from a solution of the algebraic Riccati equation. The safety/acceptability criteria 34, which may be formulated as Q, R matrices, and the end-point Mayer cost $S_f$ describe the optimization cost functional 44, $J(S_f,Q,R)$. This formulation is unique to an Infinite Horizon Neighboring Optimal Control approach.

An optimal trajectory 46 may be found computationally using the high fidelity model 36 by solving a Hamiltonian Boundary Value Problem. The resulting nominal trajectory provides an optimal flight path and open-loop control inputs. Given this optimal trajectory 46, the high fidelity model may be linearized along a prescribed flight path, resulting in a local model 48. The local model 48 may then be used to compute time-varying feedback gains 50 by solving the differential Riccati equation. Given the optimal trajectory 46 and feedback control gains 50, the store separation autopilot 52 may be implemented using a standard feedback control loop, such as that illustrated in FIG. 5 above, with the dynamic system 26 incorporating the appropriate models discussed in relation to FIG. 6.

Application of neighboring optimal control to store separation is straight forward. A quadratic cost functional, given by Equation (1) is sufficient for this investigation, where Q is a constant positive semi-definite matrix Q≥0 and R is a constant positive definite matrix R>0. The weighting matrices Q and R are chosen by a user to influence a magnitude of a state and control vector, respectively. Matrix $S_f$≥0 is specified by the user to achieve satisfactory terminal conditions.

$$J = \frac{1}{2}x(t_f)^T S_f x(t_f) + \frac{1}{2}\int_{t_0}^{t_f}(x^T Q x + u^T R u)dt \qquad (1)$$

Using the quadratic cost functional, first order optimality conditions without terminal constraints are stated in Equations (2) through (4).

$$\dot{x}(t)=f(x(t),u(t)), x(t_0) \text{ specified} \qquad (2)$$

$$\dot{\lambda}(t)=Qx(t)-f_x^T(t)\lambda(t), \lambda(t_f)=S_f x(t_f) \qquad (3)$$

$$u(t)=-R^{-1}f_u^T(t)\lambda(t) \qquad (4)$$

Due to the difficulty of modeling store separation aerodynamics, it is desirable to isolate the aerodynamic terms appearing in the state equation $\dot{x}(t)=f(x,u)$. This allows optimality equations to be used with a variety of aerodynamic models. Recognizing that the aerodynamic terms are also functions of the state and control, the state equations can be written in functional form as shown in Equation (5), where $C_F(x,u)$ and $C_M(x,u)$ are the aerodynamic force and moment coefficients, respectively.

$$\dot{x}(t)=f(x,C_F(x,u),C_M(x,u)) \qquad (5)$$

Using the notation in Equation (5), the Jacobian matrices in Equations (3) and (4) can be expanded as follows.

$$f_x \triangleq \frac{\partial f(x, C_F, C_M)}{\partial x} = \frac{\partial f_0}{\partial x} + \frac{\partial f}{\partial C_F}\frac{\partial C_F}{\partial x} + \frac{\partial f}{\partial C_M}\frac{\partial C_M}{\partial x} \qquad (6)$$

$$f_u \triangleq \frac{\partial f(x, C_F, C_M)}{\partial u} = \frac{\partial f_0}{\partial u} + \frac{\partial f}{\partial C_F}\frac{\partial C_F}{\partial u} + \frac{\partial f}{\partial C_M}\frac{\partial C_M}{\partial u} \qquad (7)$$

Equations (6) and (7) can be written more concisely using subscript notation to represent partial differentiation, where the notation $f_{x_0}$ and $f_{u_0}$ implies the derivative is taken while holding the aerodynamic coefficients constant.

$$f_x = f_{x_0} + f_{C_F} C_{F_x} + f_{C_M} C_{M_x} \quad (8)$$

$$f_u = f_{u_0} + f_{C_F} C_{F_u} + f_{C_M} C_{M_u} \quad (9)$$

The matrices $C_{F_x}$ and $C_{M_x}$ represent the aerodynamic stability derivatives, and the matrices $C_{F_u}$ and $C_{M_u}$ represent the aerodynamic control derivatives. These matrices may be determined analytically when a parametric form of the aerodynamic model is available, often as a result of system identification. Alternatively, they can be estimated numerically using finite differencing or an alternative numerical recipe.

Beginning with the necessary conditions in Equations (2) through (4), the linear differential equations for a neighboring extremal are summarized in Equations (10) through (12).

$$\delta \dot{x}(t) = f_x \delta x + f_u \delta u \quad (10)$$

$$\delta u(t) = -R^{-1} f_u^T S \delta x \quad (11)$$

$$\dot{S}(t) = -S f_x - f_x^T S + S f_u R^{-1} f_u^T S - Q, S(t_f) = S_f \quad (12)$$

Equations (10) through (12) are a compact set of differential equations that can be used to implement a Store Separation Autopilot that minimizes the original cost function to second order in the presence of disturbances along a predetermined optimal trajectory. The matrix Riccati equation (12) is evaluated along an optimal trajectory to determine feedback gains $K(t) = -R^{-1} f_u^T S$ and the results are stored along with the nominal state and control, $x^*(t)$ and $u^*(t)$. The neighboring optimal control input can be determined real-time using feed forward of the nominal control plus feedback proportional to the deviation of the measured state from the reference trajectory, $u(t) = u^*(t) - K(t) \delta x(t)$.

Aerodynamic characteristics of a store in the vicinity of the aircraft are inherently nonlinear. Aerodynamic nonlinearities appear through large flow field gradients near the aircraft as well as decay of the aircraft effects in far field conditions. Thus, the store transitions through a time (or spatially) variant nonlinear regime and rapidly approaches a trimmed freestream flight condition that can be adequately approximated by time invariant linear behavior. One approach to controlling a store in these two disparate flight regimes is to switch between a nonlinear time variant controller and a linear time invariant controller. Another approach is to design a single control system that accounts for the nonlinear flight regime and converges to a linear time invariant controller in far field conditions. The latter approach is adopted here in a process herein referred to as Infinite Horizon Neighboring Optimal Control, which is graphically illustrated as elements 36-50 in FIG. 6.

The neighboring optimal feedback gains $K(t) = -R^{-1} f_u^T S$ may be determined in part by the solution to the matrix differential Riccati equation (12). The Jacobian matrices $f_x$ and $f_u$ are in general time-varying. For store separation, these matrices result from linearization along a predetermined trajectory and vary with time and/or distance from the aircraft due to the nonlinear aerodynamic characteristics. However, as the distance between the store and aircraft becomes large, the effect of the aircraft flow field becomes negligible and the Jacobian matrices converge to constant freestream quantities, denoted here as F and G.

$$\lim_{t \to t_f} f_x(t) \to F \quad (14)$$

$$\lim_{t \to t_f} f_u(t) \to G \quad (15)$$

In this limiting case, the matrix differential Riccati equation (DRE) approaches a constant solution, resulting in an algebraic Riccati equation (ARE) which may be solved numerically to yield $S_f$.

$$0 = -S_f F - F^T S_f + S_f G R^{-1} G^T S_f - Q \quad (16)$$

The solution to the ARE can be used to determine the constant feedback gains $K_f = -R^{-1} G^T S_f$. The resulting linear time invariant control system is mathematically equivalent to a Linear Quadratic Regulator (LQR).

Returning to the original quadratic cost functional in Equation (1), the matrix $S_f$ is used to denote a user-specified weighting matrix that determines an end point (Mayer) cost. Choosing the Mayer cost to be consistent with the solution to the ARE results in a time varying gain matrix that approaches a constant quantity as the system converges to a time invariant system. The time invariant gains can be used to maintain the system near the desired operating condition indefinitely.

$$\lim_{t \to t_f} K(t) \to K_f \quad (17)$$

Figure 5:
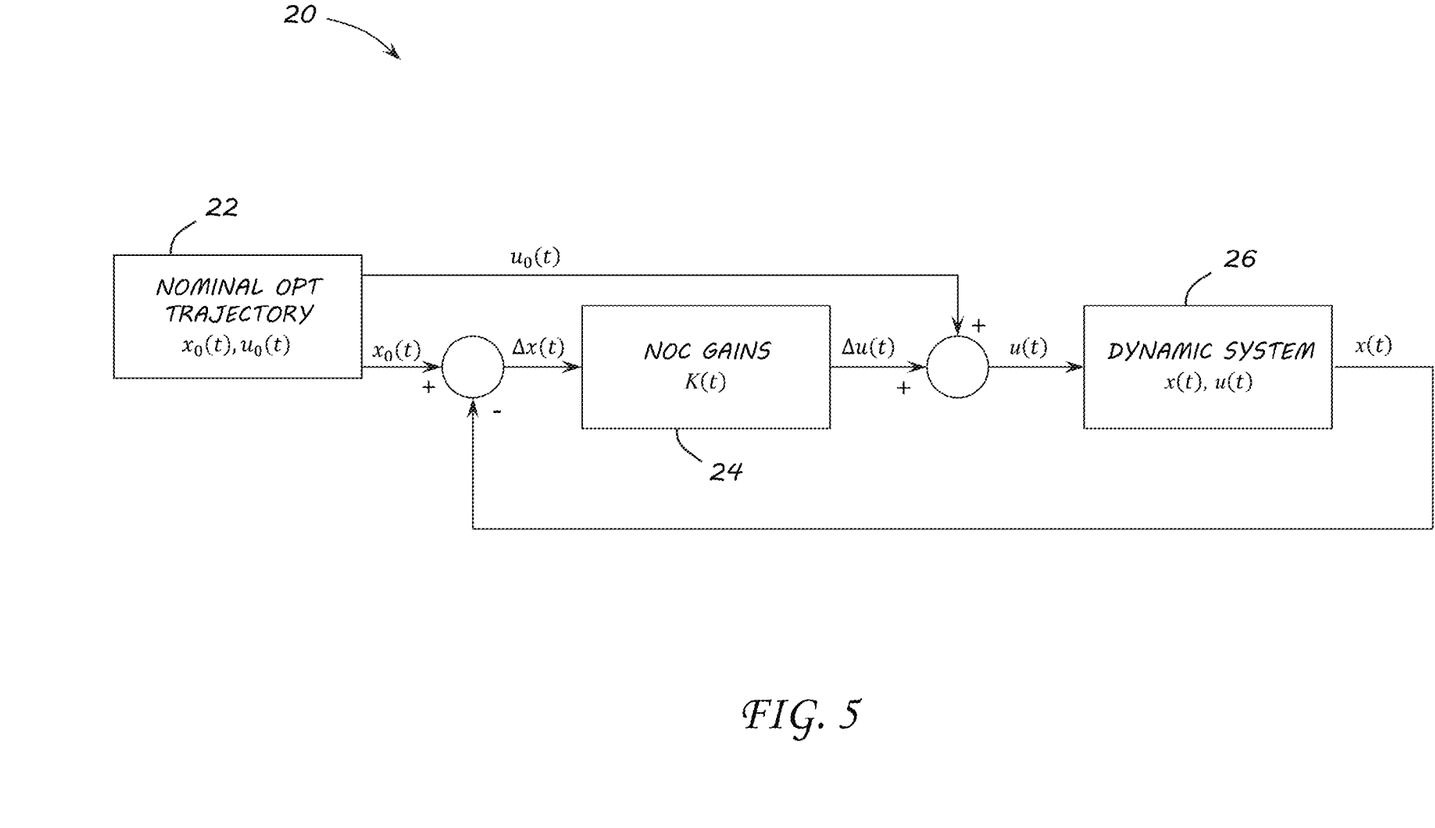
FIG. 5 is a block diagram illustrating a feedback control loop consistent with embodiments of the invention.

Thus, Infinite Horizon Neighboring Optimal Control (IH-NOC) consists of three sequential steps as illustrated in the block diagram 20 in FIG. 5. First, optimal control theory is used to determine a nominal reference trajectory that optimizes a desired performance index for a dynamic system with transitory nonlinear characteristics in block 22. Next, neighboring optimal control is used to implement a feedback control system that optimizes the original performance index to second order in the presence of disturbances along the optimal path in block 24. Finally, as the system approaches an operating condition that is adequately represented by a linear system model in block 26, the feedback controller converges to a linear time invariant regulator that may be used to keep the system near the desired operating condition indefinitely. While this may be possible, embodiments of the store separation autopilot are envisioned to be a transitional control system that is active for a relatively short period of time between the release of the store and a transition to the flight management system that directs the store to its target destination.

Figure 2:
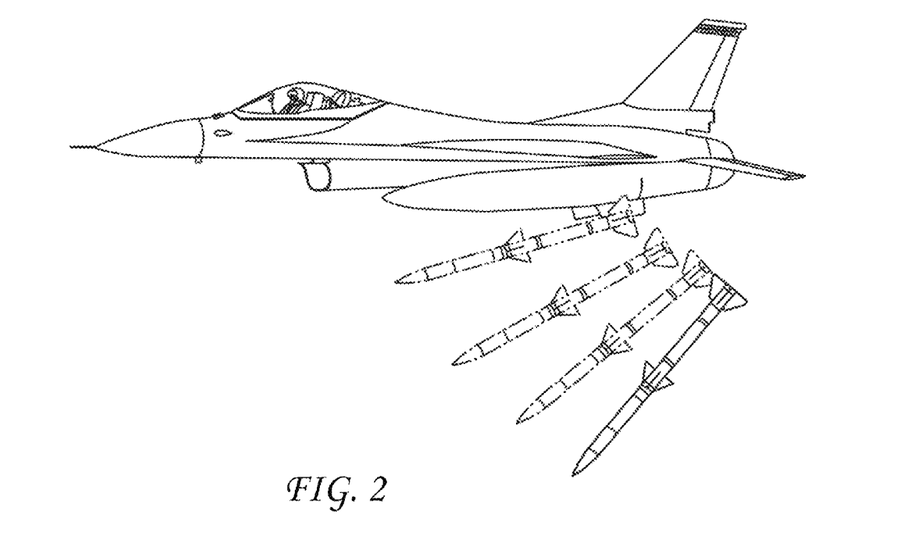
FIG. 2 is an exemplary illustration of a safe and unacceptable release of a store.

In a practical application of the store separation autopilot, an example is presented below of a representative store separating from an exemplary F-16 aircraft, such as those graphically illustrated in FIGS. 1-3. The F-16 is a multi-role supersonic fighter aircraft originally developed by General Dynamics. The F-16 may be configured to an air-to-air or air-to-ground configuration and may be equipped to carry a range of external stores. Separation of a representative store from the F-16 is illustrated in FIG. 3. Wind tunnel testing was conducted to quantify freestream aerodynamic characteristics of a store, as well as spatially variant effects of the aircraft flow field. Flight testing was conducting using an uncontrolled inert separation test vehicle to demonstrate save and acceptable separation characteristics. For the present example, wind tunnel data were used to determine a nonlinear spatially variant aerodynamic model for trajectory optimization. The optimization was accomplished using full nonlinear six degree of freedom equations of motion and simulations were conducted using conventional store separation trajectory prediction methods.

FIGS. 7A-D and 8A-D illustrate optimal trajectories computed using initial conditions, mass properties, and flight conditions from two flight test missions, a subsonic mission—Mach 0.9/550 KCAS/4800 ft, and a supersonic mission—Mach 1.2/600 KCAS/18,000 ft, respectively. The performance metric was specified using a quadratic cost functional with weighting factors selected to minimize the store incidence angles $\alpha_s(t)$ and $\beta_s(t)$ and the roll rate p(t) without excessive control effort. The pitch and yaw rates were also reduced through kinematic correlation with the derivatives $\alpha_s(t)$ and $\beta_s(t)$. The specific values of the Euler angles $\psi(t)$, $\theta(t)$, and $\Phi(t)$ were not of particular concern, only the incidence angles and roll are were included in the cost function.

In comparison to the subsonic trajectory, the supersonic flow field resulted in a larger nose-down aerodynamic pitching moment near carriage. The optimal control used a maximum control authority of $-10$ degrees to arrest the pitch rate and angle of attack. The stronger flowfield resulted in higher deviations in pitch rate throughout the trajectory. Even in these adverse conditions, the optimal control successfully brought the store to a stable trimmed flight condition within a 1 second time interval. These results indicate that the control effectively transfers the store from aircraft carriage to stable trimmed flight in an optimal manner.

FIGS. 9A-D show a comparison between an uncontrolled (jettison) flight test trajectory for the subsonic test flight mission and the computed optimal trajectory illustrated in FIGS. 7A-D. FIGS. 10A-D show a similar comparison of the supersonic flight test with the optimal trajectory from FIGS. 8A-D. In both cases, the controlled separation shows a dramatic improvement over the flight test trajectory in terms of acceptability margins. For the supersonic test mission, the maximum angle of attack was reduced from $\alpha_{max}=-20$ deg to $\alpha_{max}=-5$ deg and the maximum pitch rate was reduced from $q_{max}=130$ deg/sec to $q_{max}=28$ deg/sec.

Comparison of the optimal trajectories between flight conditions is also valuable. Whereas the flight test trajectories are dramatically different between the subsonic and supersonic flight conditions, the optimal trajectories are very similar. The optimal control program not only provides a measurable improvement in safety and acceptability, but it also assists in reducing the variability in trajectory characteristics between flight conditions. The uniformity between flight conditions is an advantage for ensuring safe and acceptable employment across the flight envelope.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An air-to-ground guided munition, comprising:
    flight control surfaces; and
    a flight management system configured to manipulate the flight control surfaces and having a store separation autopilot and a mission autopilot,
    wherein the store separation autopilot is activated when the air-to-ground munition is released from a platform, and
    further wherein the store separation autopilot is configured to:
        determine a nominal reference trajectory that optimizes a desired performance index for the air-to-ground guided munition using optimal control theory;
        implement a feedback control system that optimizes an original performance index to second order in a presence of disturbances along an optimal path using neighboring optimal control and corresponding manipulation of the flight control surfaces;
        converge, via the feedback control system, to a linear time invariant regulator approaching the desired operating condition along the optimal path; and
        transition control of the flight management system of the air-to-ground munition to the mission autopilot.

2. The air-to-ground guided munition of claim 1, wherein control of the flight management system of the air-to-ground munition is transitioned to the mission autopilot after a specific interval of time.

3. The air-to-ground guided munition of claim 2, wherein the specific interval of time is one second.

4. An air-to-ground guided munition, comprising:
    flight control surfaces; and
    a flight management system configured to manipulate the flight control surfaces and having a store separation autopilot and a mission autopilot,
    wherein the store separation autopilot is activated when the air-to-ground munition is released from a platform, and
    further wherein the store separation autopilot is configured to:
        determine a nominal reference trajectory that optimizes a desired performance index for the air-to-ground guided munition using optimal control theory by:
            determining an optimal trajectory including an optimal flight path and open-loop inputs using a high fidelity model; and
            generating a local model by linearizing the high fidelity model along a prescribed flight path,
            wherein the local model is used to determine time-varying feedback gains;
        implement a feedback control system that optimizes an original performance index to second order in a presence of disturbances along an optimal path using neighboring optimal control and corresponding manipulation of the flight control surfaces;
        converge, via the feedback control system, to a linear time invariant regulator approaching the desired operating condition along the optimal path; and
        transition control of the flight management system of the air-to-ground munition to the mission autopilot.

5. The air-to-ground guided munition of claim 4, wherein control of the flight management system of the air-to-ground munition is transitioned to the mission autopilot after a specific interval of time.

6. The air-to-ground guided munition of claim 5, wherein the specific interval of time is one second.

7. The air-to-ground guided munition of claim 4, wherein the high fidelity model includes dynamic system information and safety and acceptability criteria.

* * * * *